United States Patent [19]

Palmer et al.

[11] Patent Number: 5,746,653
[45] Date of Patent: May 5, 1998

[54] AIR DISTRIBUTOR OR COLLECTOR

[75] Inventors: Edward G. Palmer, Elk River; Ephraim M. Sparrow, St. Paul, both of Minn.

[73] Assignee: Solar Attic, Inc., Elk River, Minn.

[21] Appl. No.: 717,148

[22] Filed: Sep. 20, 1996

Related U.S. Application Data

[63] Continuation-in-part of Ser. No. 528,720, Sep. 15, 1995, abandoned.

[51] Int. Cl.⁶ .................................................. F24F 7/02
[52] U.S. Cl. ........................... 454/186; 454/233; 454/253; 454/341
[58] Field of Search ............................ 454/185, 186, 454/230, 231, 233, 253, 296, 306, 341, 93, 188, 191, 198

[56] References Cited

U.S. PATENT DOCUMENTS

| | | | |
|---|---|---|---|
| 1,717,904 | 6/1929 | Abernethy | 454/93 |
| 2,483,704 | 10/1949 | Leigh | 454/233 |
| 3,052,176 | 9/1962 | Anderson | 454/253 |
| 3,492,934 | 2/1970 | Steigerwald | 454/233 |
| 3,602,212 | 8/1971 | Howorth | 454/296 X |
| 3,633,659 | 1/1972 | Ohlsson | 454/186 X |
| 4,134,545 | 1/1979 | Westbrook | 454/233 X |
| 4,829,885 | 5/1989 | McVicker | 454/185 |
| 4,929,262 | 5/1990 | Balon, Jr. et al. | 454/296 X |
| 5,044,259 | 9/1991 | Catan et al. | 454/306 |
| 5,453,049 | 9/1995 | Tillman, Jr. et al. | 454/341 X |

FOREIGN PATENT DOCUMENTS

| | | | |
|---|---|---|---|
| 293275 | 8/1916 | Germany | 454/230 |

OTHER PUBLICATIONS

Ephraim M. Sparrow et al., "Enhanced Applications of Attic–Collected Solar Energy", Solar 95 Conference Proceedings, American Solar Energy Society, Boulder, Colorado, Jul. 15, 1995, pp. 1–18.

Primary Examiner—Harold Joyce

[57] ABSTRACT

The apparatus can distribute and collect air. As a collector, a fan draws air from the proximal end of an elongated tube disposed in an air-environment. The tube is closed at the distal end but receives air all along its length through its air-permeable wall. The wall is more permeable to air at its distal end than at its proximal end. Wall permeability gradually increases from the proximal end to the distal end so that a substantially constant rate of air ingestion occurs at all points along the wall. A reversal of the airflow direction converts the air collector into an air distributor for distributing air evenly along its length.

9 Claims, 3 Drawing Sheets

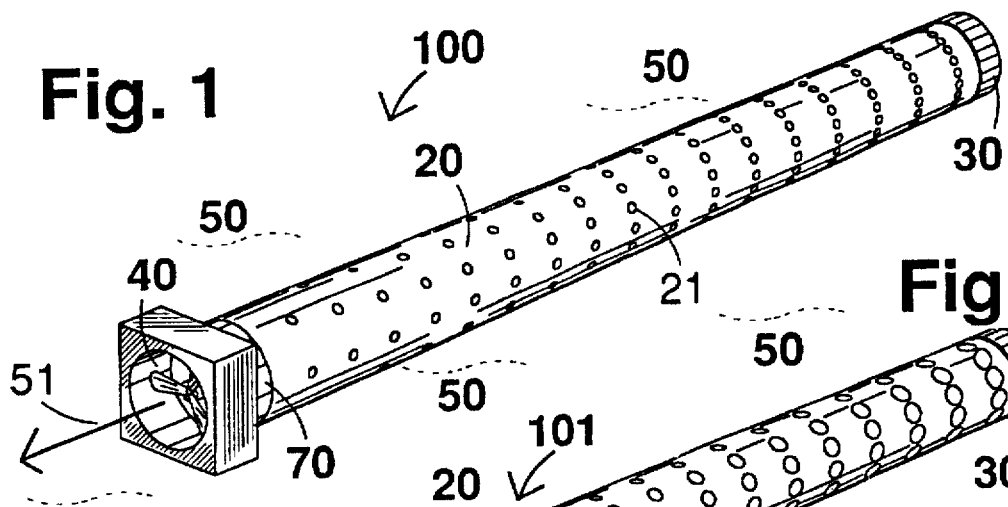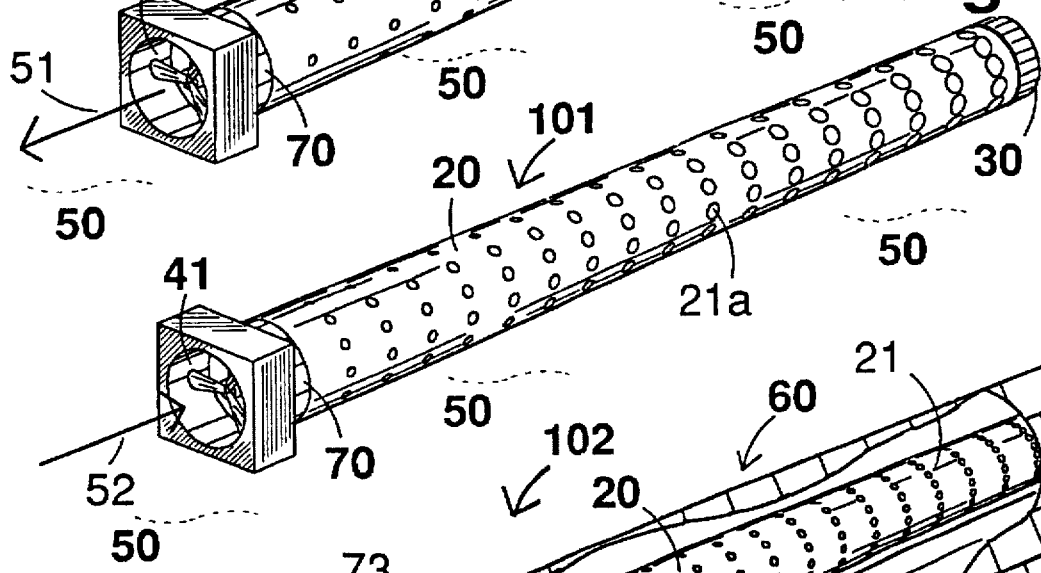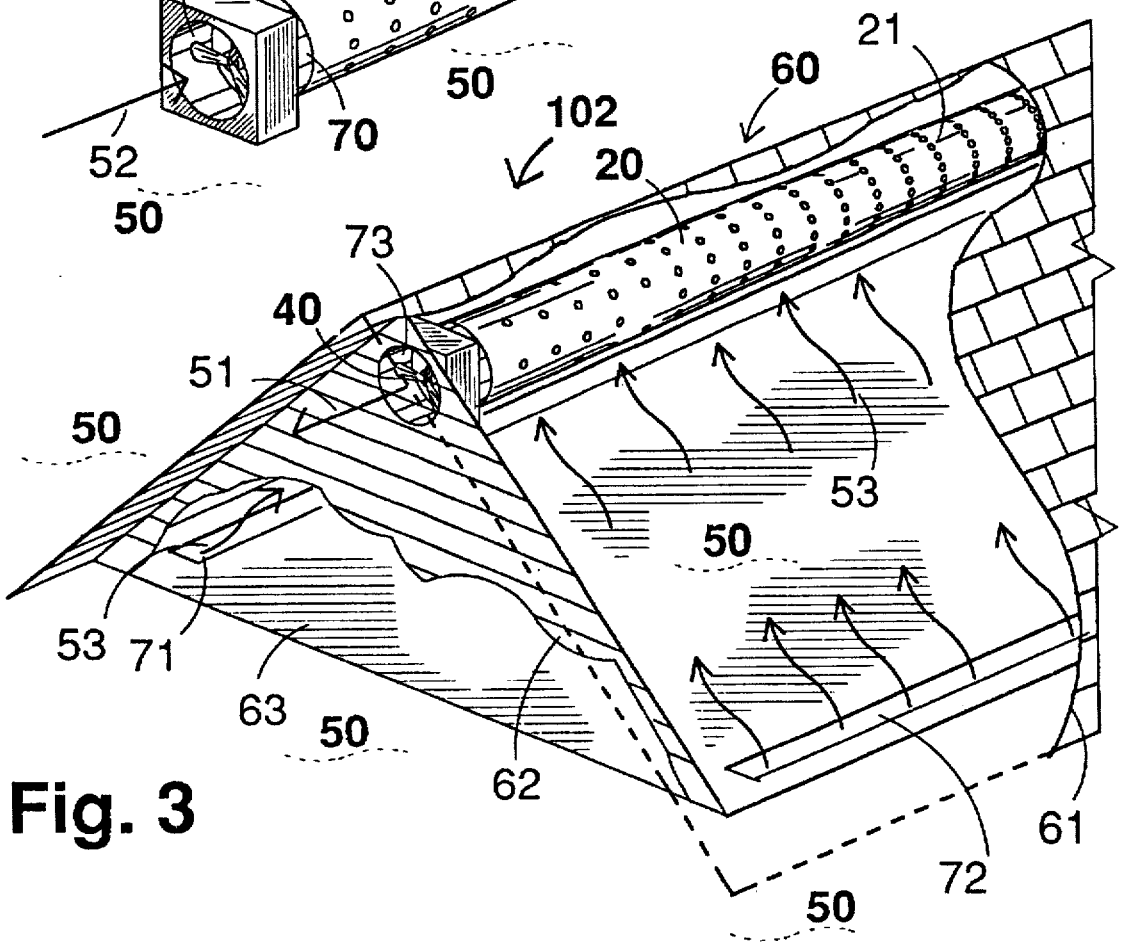

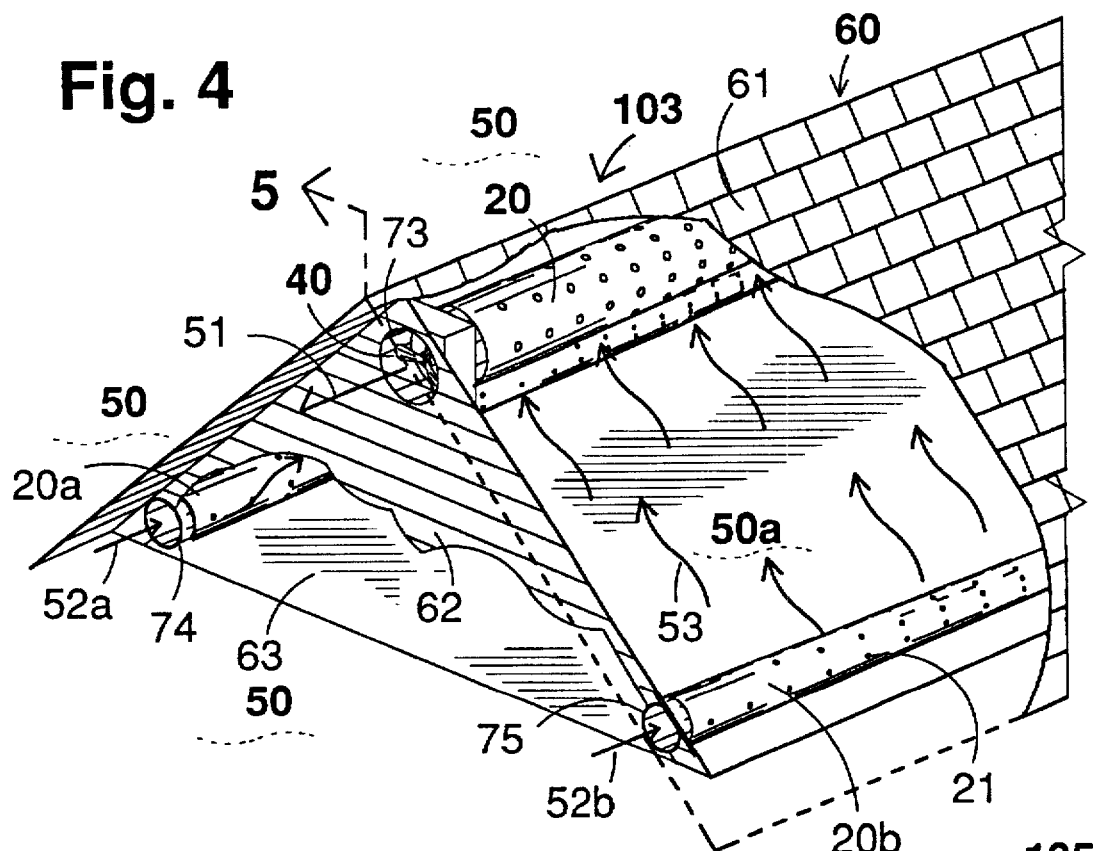
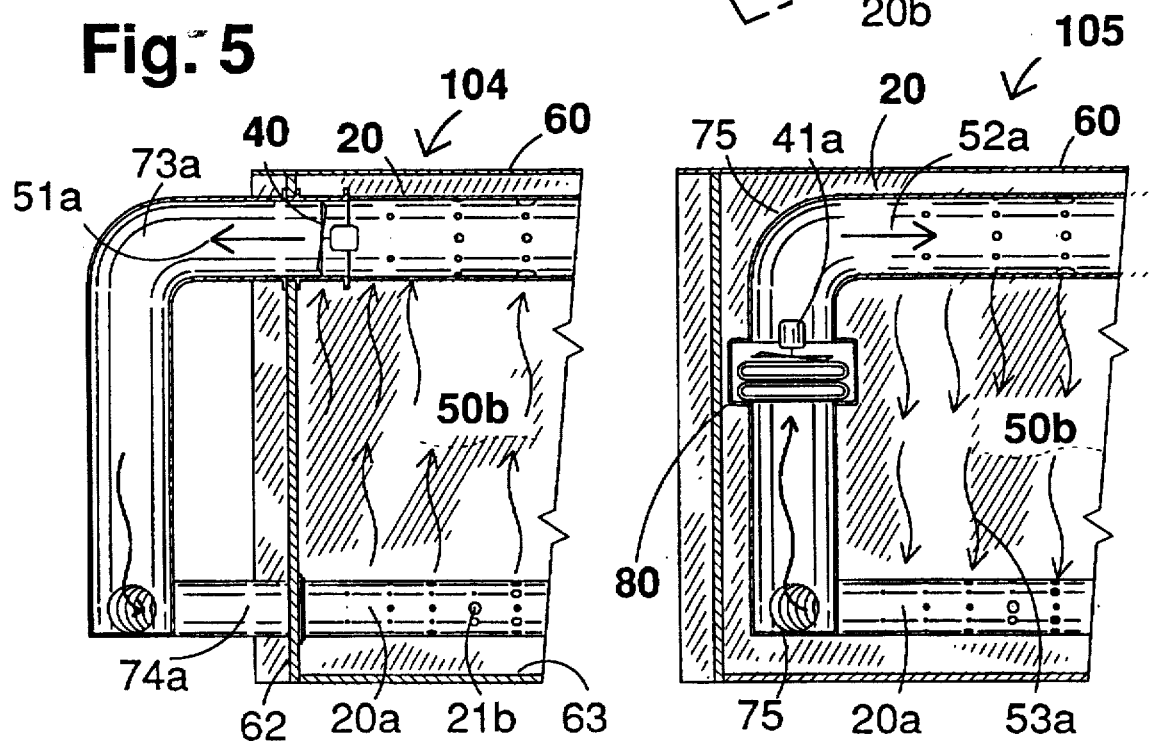

5,746,653

AIR DISTRIBUTOR OR COLLECTOR

This is a continuation-in-part of U.S. patent application Ser. No. 08/528,720 filed, Sep. 15, 1995 by applicant, now abandoned.

FIELD OF INVENTION

This invention relates to ducts for distributing and collecting air, more particularly where air is forced through a duct by means of a fan.

BACKGROUND

It is well known to move air inside a building or an attic by means of a fan.

The practice of attic air withdrawal keeps the attic free from stagnant damp air and removes accumulated hot air during hot weather. Usually the fan is located adjacent to the apex of the attic ceiling, positioned to directly exhaust air from the attic. Fresh air to replace the exhausted air enters the attic through inlet vents in the lowest portion of the attic.

To provide an effective attic fan and vent system, a builder must preferably install a continuous-open-vent, or multiple vents along the attic perimeter, in or near, the attic floor. For many building designs, free movement of air in the attic is problematic. Objects such as posts, beams, trusses, partitioning walls, ducts, and water heaters, etc. in the attic provide barriers to free air flow and create stagnant-air pockets even when there is a continuous-open-vent. Often the placement of the vent above external sources of damp air is unavoidable and adds to the problem of keeping attic-air dry. In many cases the vents allow insects and rodents to gain access to the attic. Air exhaust outlets in the roof increase the possibility of leakage and the fan is often so inaccessible that it is prone to corrode and fail due to a lack of maintenance.

It is well known to use high-powered fans for forcing temperature and moisture-conditioned air through distributing airducts. Such systems are often used in spacious buildings, such as warehouses and greenhouses. The distributing ducts are usually located high overhead where they will not encumber traffic in the building. Louvered vents in the distributing ducts direct high velocity air downward producing turbulent air currents to minimize stagnant air-pockets. These fan and duct systems are functional, but air distribution is uneven, not always satisfactory or energy-efficient.

SUMMARY OF THE INVENTION

This disclosure describes an energy-efficient, low-velocity, fan and airduct combination designed to provide even, continuous, air circulation within the space of an enclosure such as a building, an attic, a room, a container, etc. The invention cooperates with natural convection air currents to provide sufficient widely distributed air and prevents the occurrence of stagnant air pockets. The invention avoids the disadvantages discussed in the Background section above.

A major element of the invention is an elongated tube having a peripheral permeable wall disposed in an air-environment. The tube has a proximal end and a distal end. A fan closest to the proximal end circulates air to and from the air-environment in a flow circuit which includes air flow through the tube's proximal end and through the tube's permeable wall.

A terminating means controls a portion of air that flows through the distal end of the tube. The terminating means cooperates with the fan and the permeable wall openings to define an airflow-rate through any portion of the permeable wall along the axial length of the tube. The terminating means may take the form of a cap partially or totally closing the distal end, or the position of the distal end with respect to a wall of the enclosure; to restrict the amount of distal end airflow, or the tube may be tapered proximate the distal end to a smaller diameter. The relationship between the permeable wall openings and the terminating means is defined by an algorithm. Wall openings are arranged in size and quantity and relate to the surface area of the permeable wall such that they provide a progressively increasing wall air flow-through area per unit surface area of the permeable wall along the axial length of the tube. In a preferred embodiment a substantially constant airflow rate through the wall is achieved all along the axial length of a uniform diameter, circular section, tube. In this embodiment the tube is terminated by a cap and each incremental flow-through area required along the tube is calculated using the length and diameter parameters of the tube. A suitable hole pattern for the required flow-through area can also be defined using an algorithm. The fan can be adapted to force air into the tube to discharge air from each portion of the duct wall along its length, or it can be adapted to force air out from the tube's proximal end so that air is drawn in and collected by the tube at all portions of the permeable wall along its length. The choice of air distribution or collection depends entirely on the application. In some instances the same elements can be used for distribution or collection of air simply by changing the rotational direction of the fan blades.

BRIEF DESCRIPTION OF THE DRAWINGS

FIG. 1 An air collector.

FIG. 2 An air distributor.

FIG. 3 A vented attic air-circulation system.

FIG. 4 A distributed attic air-circulation system.

FIG. 5 A section of closed-circuit airflow system.

FIG. 6 A section of conditioned-air circulation system.

DETAILED DESCRIPTION OF THE INVENTION

Figure 7:
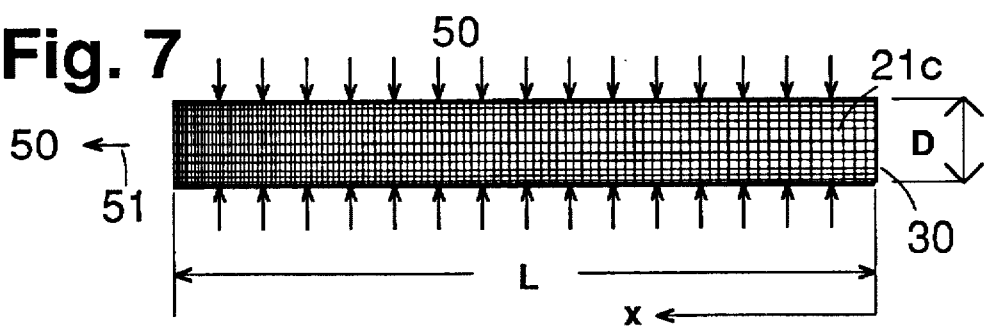
FIG. 7 A model diagram of a permeable tube.

DEFINITIONS for the purpose of clarity and brevity.

Duct

A means for channeling or controlling the directional flow of air. Any mechanical barrier, opening, slit, tube, pipe, conduit, enclosure, passage, corridor, trough, channel, canal, etc. which would guide moving air.

Fan

The airflow driving force in this invention is referred to as a fan. The word "fan" is used in a generic form and is meant to apply to any mechanical device which is capable of moving air and causing it to flow in a tube or tubes such as those described in this disclosure. A device having name such as blower, respirator, ventilator, bellows, etc. referred to in this disclosure as a "fan".

Tube

A hollow cylinder or pipe. A plurality of hollow cylinders placed end to end to form an elongated tube. The tube may have a cross-sectional shape which is rectangular, hexagonal, elliptical, circular, triangular or any other geometric form.

The attic example

A preferred embodiment of the invention uses an attic as the enclosure in the air-environment.

Air collection

The attic air collection duct system includes an elongated tube having a plurality of openings in its peripheral wall all along the length of the tube making it permeable to air. It is mounted under the roof in the apex of an attic ceiling in an air-environment collecting air. A fan connecting with the open proximal end of the tube draws the air from the air-environment in the attic through the permeable wall all along its length. The collected air passes from the tube's proximal end to the fan where it is then discharged from the attic. The air discharged from the fan can circulate in a flow circuit within the attic, or it can circulate in a flow circuit which includes an air-environment surrounding (outside) the attic, returning to the attic air-environment via openings in the attic wall or vents in the attic floor. The tube end distal from the fan is usually terminated by a terminating means so that either no air can enter through the distal end, or that the amount of air flowing through the distal end is limited by terminating means. The terminating means is usually a cap attached to the distal end, but it may be a defined space between the distal end and the attic wall. Air flowing in through the terminating means becomes a portion of the air flowing within the tube and it effects the portion of air flowing through the wall openings. The effect of the terminating means must enter into any algorithm used for calculating the wall openings. The size and quantity of the wall openings define the progressively increasing wall air flow-through area per unit surface area of the tube wall along the axial length of the tube. The surface area of the tube wall is calculated using the cross sectional dimensions of the tube and its axial length. The fan may be positioned to expel the collected air from the attic. Alternatively, heat energy can be removed from the collected attic-air for use elsewhere, by passing it through a heat exchanger.

Air distribution

Air is evenly distributed in the attic by reversing the thrust direction of the fan, causing the air to flow into the duct. When the fan ingests outside air, distributing ducts can be used as an alternative to the customary continuous peripheral air vents described in the Background section of this disclosure. A combination of distribution and collection ducts provides many possibilities for drying, moving, and for extracting heat from attic-air.

It will become obvious to a person skilled in the art of heating and conditioning air, that this invention has uses, not limited to the control of air in attics.

The permeable wall

The wall openings making the wall permeable provide air distribution at relatively low airflow rates through the tube wall compared to prior art. This is a major improvement over the prior art, which has relied on jets, baffles, plugs and knock-out devices to control the airflow. The invention follows the rule that the openings will provide a progressively increasing wall air flow-through area per unit surface area of the tube wall along the axial length of the tube. A constant airflow-rate through the wall can be achieved using this rule. However, some variation in through-wall airflow-rate along the tube can also be achieved by modifying the algorithm used to calculate the size, quantity and pattern of the wall openings.

To achieve a constant airflow-rate through the tube wall at all points along its length, the tube wall is made pervious to air such that for each incrementally greater distance from the proximal end there is a corresponding incremental increase in wall-opening flow-through area. Wall-openings must, therefore, be incrementally larger per unit area of wall with each incrementally longer distance from the proximal end, or the quantity of wall-openings per unit area of wall must increase with each incrementally longer distance from the proximal end, or a combination of wall-opening size and quantity must be adjusted to provide the required incremental flow-through area increase with each incrementally longer distance from the proximal end. It is possible to weave a permeable tube from a material which is woven more tightly at the proximal end than at the distal end to achieve a smooth change in airflow area (flow-through area) along the tube. However, it will be more usual to perforate an air-impervious tube wall to make it permeable to air. Perforation results in finite stepped-change permeability along the length of the tube. It is, therefore, practical to consider the length of the tube as a plurality of finite portions defining segments of the permeable wall, with the wall being perforated such that the airflow-rate through the wall within the bounds of each segment is substantially the same.

An algorithm must be derived to calculate the incremental change in permeability per segment using the basic geometric dimensions of the tube to design the permeable wall. Typically the wall-openings are calculated using an algorithm based on the overall dimensions of a tube closed at its distal end. The resulting tube may subsequently be shortened (within limits) to suit applications requiring a shorter but similar tube. The altered tube is closed at its truncated distal end by an air-permeable cap. The cap provides a virtual end to the duct beyond the actual truncated distal end. In a preferred embodiment of the invention the tube has a circular cross-section and a cap closing its distal end. Other tubes having different cross-sectional geometry may be calculated using a modification of the principles used for calculating wall-opening area per unit length for a circular section tube.

FIG. 1 shows air collection duct system 100 operating in an air-environment depicted by wavy broken line 50 surrounding a tube 20. A fan 40 is adapted to connect with tube 20 via a duct section 70. Fan 40 draws air from tube 20 and exhausts it to an air-environment 50. An arrow 51 depicts the airflow direction. Tube 20 is made from air impervious material such as aluminum, steel and plastic etc. The wall of the tube is perforated by a plurality of holes, typified by a hole pattern 21. The length of tube 20 is divided into portions (not shown). Each portion is a segment of the tube with all segments being of equal or non-equal length. Hole pattern 21 perforating tube 20 shows an increase in the quantity of holes per segment through the tube wall around its circumferential periphery as the distance to each set of holes from the fan is increased. This hole pattern is designed to cause air to be drawn into tube 20 at the same inflow rate per segment along the length of the tube. A cap 30 generally blocks the inflow of air to the end of tube 20, distal from fan 40. Hole pattern 21 is designed to suit a particular length and diameter of tube 20. However, if tube 20 is shortened from this particular length, cap 30 must be perforated (not shown) to allow some air to flow into the tube. Cap perforations provide the tube with a virtual length equal to the length which was used to calculate the hole pattern assuming a nonperforated cap and corresponding to a constant air inflow rate per tube segment.

FIG. 2 shows air distribution duct system 101 operating in an air-environment depicted by wavy broken lines 50 surrounding tube 20. Fan 41 is adapted to connect with tube 20 via duct section 70. Fan 41 forces air into tube 20 from air-environment 50. Arrow 52 depicts the airflow direction. In a preferred embodiment, tube 20 is made from thin polyester sheet material wrapped around a spiral wire former, and suspended in attic 60 using a thin wire harness. The wall of tube 20 is perforated by a plurality of holes, typified by hole pattern 21a. The length of tube 20 is divided into portions. Each portion is a segment of the tube, with all segments being of equal or nonequal length. Hole pattern 21a perforating tube 20 shows the diameter of the holes perforating the tube wall in each segment increases as the distance to each set of holes from the fan is increased. This hole pattern is designed to cause air to be expelled from tube 20 at the same outflow rate per segment along the length of the tube. A cap 30 generally blocks the outflow of air from the end of tube 20, distal from fan 40. Hole pattern 21a is designed to suit a particular length and diameter of tube 20. However, if tube 20 is shortened from this particular length, cap 30 must be perforated (not shown) to allow some air to flow from the tube. Cap perforations provide the tube with a virtual length equal to the length which was used to calculate the hole pattern assuming a non-perforated cap and corresponding to a constant air outflow rate per tube segment.

FIG. 3 An attic 60 having a portion of the roof 61 and a portion of an end wall 62 removed, shows air collection duct system 102 operating to move air inside attic 60. Tube 20 is mounted under the apex of roof 61 in attic 60, collecting rising air (typified by wavy arrow 53) in an air-environment (typified by wavy broken line 50). Fan 40 draws air from tube 20 via perforations in the tube wall having a hole pattern 21. The air is exhausted from tube 20 to air-environment 50 outside attic 60 via duct section 73 passing through attic wall 62. Direction arrow 51 shows the direction of the exhausted air. The air-environment pressure inside attic 60 is lowered due to the air exhaust and this causes air to enter attic 60 through vent openings 71 and 72 in attic floor 63. This air is depicted by wavy arrows (typified by wavy arrow 53) and is part of an airflow circuit in which air circulates via tube 20 from and to the air-environment 50 due to the air movement caused by fan 40.

FIG. 4 An attic 60 having a portion of the roof 61 and a portion of an end wall 62 removed, shows air collection duct system 103 operating to move air in attic 60. Tube 20 is mounted under the apex of roof 61 in attic 60, collecting rising air (typified by wavy arrow 53) in an air-environment (typified by wavy broken line 50a). Fan 40 draws air from tube 20 via perforations in the tube wall. The air is exhausted from tube 20 to air-environment 50 outside attic 60 via duct section 73 passing through attic wall 62. Direction arrow 51 shows the direction of the exhausted air. The air-environment pressure inside attic 60 is lowered due to the air exhaust and this causes outside air to enter attic 60 via duct sections 74 and 75 positioned in openings in attic wall 62. Directional arrows 52a and 52b indicate the air flow direction. Air flows into the attic air-environment (depicted by broken wavy line 50a) via tubes 20a and 20b. While fan 40 is moving air from attic 60 via tube 20 and make-up air is moving through tubes 20a and 20b the air-environment 50a in attic 60 will be at a lower air pressure than the air-environment 50 outside attic 60. Tubes 20, 20a and 20b are part of an airflow circuit circulating air through attic 60. Air circulates throughout the attic interior between the tubes 20a and 20b and tube 20 at low velocity. The air movement eliminates stagnant air pockets and keeps air-environment 50a dry. In this embodiment of the invention tube 20 is a permeable collecting tube and tubes 20a and 20b are permeable distributing tubes.

FIG. 5 shows a sectional view of embodiment 104. Attic 60 is shown in section (see section-direction 5 in FIG. 4) with ducts 73a and 74a added to form a closed airflow circuit to and from the enclosed air-environment of the attic 60 (depicted by broken wavy line 50b). This airflow duct system is also shown in section. A third duct 75a connects duct 73a to tube 52b ( not shown). Please refer to tube 52b shown in FIG. 4. This embodiment shows how fan 40 can cause air to be collected from air-environment 50b to be redistributed in attic 60 by means of tube 20a and tube 20b (not shown). Hole pattern 21b shows a mixture of hole size and quantity per set of perforations in each tube segment of tube 20a.

FIG. 6 shows a section of attic 60 with tube 20 connected in a circulating airflow circuit to tube 20a via duct 75 within attic 60. Air conditioner heat exchanger coil unit 80 is disposed in duct 75 to cool and remove moisture from the air flowing in duct 75. Fan 41a moves the air from tube 20a to tube 20. In this embodiment 105 the airflow causes tube 20a to collect air from air-environment 50b and to distribute the colder dryer air by means of tube 20.

Wavy arrow 53a typifies downward movement of cold air in the attic 60. Direction arrow 52a shows the direction of air flowing in the end of tube 20 proximal the fan 41a.

The embodiments 104 and 105 can be modified to cool or heat the air by means of heat exchanger coils. In a preferred embodiment solar heat absorbed by the air-environment 50b can be extracted and used to heat water.

Permeability Equation Derivation

Note: This derivation is for a capped, circular cross-section tube having an equal airflow rate through its permeable wall at all points along its length. See FIG. 7

| | NOMENCLATURE |
|---|---|
| D | Diameter of conduit |
| f | Friction factor |
| L | Length of conduit |
| M | Rate of ingestion per unit length |
| m(x) | Air flow rate at any x |
| m(L) | Air flow rate at conduit exit |
| P(X) | Dimensionless pressure, equation (22) |
| p(amb) | Ambient pressure in attic |
| p(x) | Static pressure at x |
| p(L) | Static pressure at conduit exit |
| Re | Reynolds number |
| T | Wall shear stress |
| X | Dimensionless axial coordinate, x/L |
| x | Axial coordinate |
| V | Air velocity |
| V(wall,x) | Air velocity passing through conduit wall; |
| V(x) | Axial velocity at x |
| β | Fraction of wall surface area that is open to airflow |
| μ | Air viscosity |
| ρ | Air density |

Fluid flow in the permeable-walled tube is analyzed by using mass and momentum conservation equations. Air flow direction is toward the proximal end from the permeable-wall. However, the principles discussed below apply equally when the airflow direction is reversed.

FIG. 7 is a side elevation of the permeable-walled tube having a diameter D and a length L. The tube is of woven material having hole pattern 21c to provide air permeability graduated along its length to suit the requirement of a constant airflow rate through the woven wall at substantially all points along the length of the tube. The tube is disposed in air-environment 50 and air is moving out of the tube in the direction indicated by arrow 51. One end of the tube is closed by cap 30.

The axial coordinate in the flow direction is x, where x=0 corresponds to the closed distal end and x=L at the open proximal end.

At any cross-section x, the mass flow rate of air is m(x). The airflow-rate into the tube through its permeable wall in a length dx is dm, subject to the constraint $$dm/dx = \text{constant} = M \quad (1)$$

Since the x=0 cross-section is capped, m(0)=0.
It follows from equation (1)

$$m(x) = [x/L]m(L) \quad (2)$$

where m(L) is the rate of mass flow at the proximal end.

In subsequent numerical results m(L) serves as a prescribable parameter (in actuality, the volumetric counterpart of m(x) will be prescribed).

Air permeates through the tube wall driven by a pressure difference. Let p(amb) be the pressure in the air-environment around the tube, and p(x) be the pressure in the tube at cross-section x. Then the local driving force for permeation is p(amb)−p(x).

This pressure drop results from two processes: (a) the acceleration experienced by the air as it passes from the relatively quiescent air-environment to the outer surface of the permeable-wall of the tube, and (b) the flow resistance of the permeable-wall. These components are, respectively, one velocity head and one-half velocity head, where $$\text{velocity head} = 0.5\rho[V(\text{wall},x)]^2 \quad (3)$$

where V(wall,x) is the air-velocity moving radially inward through the permeable wall at location x. Therefore, $$p(amb) - p(x) = 1.5 \text{ velocity heads} \quad (4)$$

From equations (3) and (4)

$$V(\text{wall},x) = \sqrt{4[p(amb) - p(x)] + 3\rho} \quad (5)$$

Ingestion rate is dm for an axial length dx having a tube surface area πDdx. A surface area Airflow Factor β(x) is open to permit ambient air to pass into the tube, where β is recognized to be a function of x. Therefore, in the length dx, $$d(\text{air flow area}) = \beta(x)\pi D dx \quad (6)$$

It follows that ingestion rate dm in an axial length dx is, $$dm = \rho[V(\text{wall},x)]\beta(x)\pi D dx \quad (7)$$

From equation (5), $$dm/dx = \beta(x)\pi D \sqrt{4\rho[p(amb) - p(x)] + 3} \quad (8)$$

The desired design condition from (1) is dm/dx=constant=M
Solving equation (8) for Airflow Factor β(x)

$$\beta(x) = (M \div \pi D) \sqrt{3 + 4\rho[p(amb) - p(x)]} \quad (9)$$

Equation (9) provides numerical values for the Airflow area β when the axial pressure distribution p(x) is known.

The momentum conservation principle is the basis for the derivation of p(x). See FIG. 8 which shows a control volume (CV) and equation nomenclature.

Figure 8:
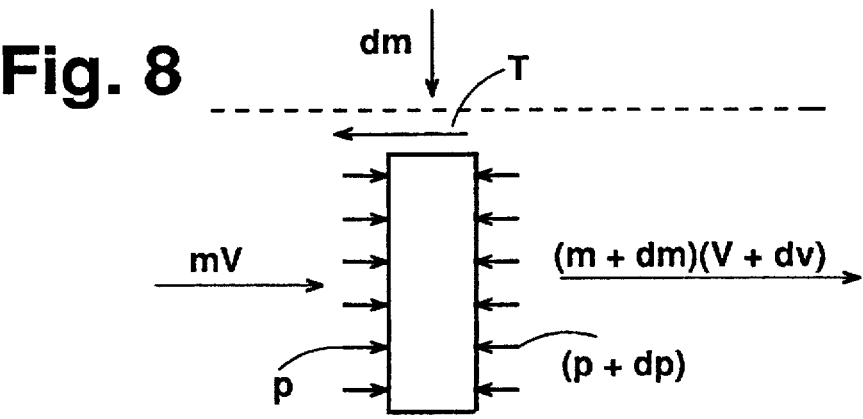
FIG. 8 A control volume diagram.

For this purpose the coordinate direction is in the x-direction. The momentum conservation principle states that the difference between the rate of x-momentum that is carried out of a control volume and the rate of x-momentum that is carried into the control volume has to equal the net x-direction force. FIG. 8 identifies the out-flowing and in-flowing x-moments and the x-direction stresses.

Velocity V denotes the cross-sectional average velocity. Pressures p and (p+dp) act on the cross-sectional area of the control volume, while the shear stress T acts on the cylindrical area that forms the interface between the control volume and the permeable wall. The areas are respectively, $$\text{cross-sectional area} = \pi D^2 \div 4 \quad (10)$$

$$\text{area of CV-wall interface} = \pi D dx \quad (11)$$

using (10) and (11) the x−momentum balance is, $$(m+dm)(V+dV) - mV = \{[p - (p+dp)]\pi D^2/4\} - T\pi D dx \quad (12)$$

At any cross-section, $$m(x) = \rho V(x)\pi D^2 \div 4 \quad (13)$$

and $$dV = dm \div [\rho \pi D^2 \div 4] \quad (14)$$

From equations (12), (13) and (14)

$$-dp/dx = 2m[dm/dx] \div \rho[\pi D^2 \div 4]^2 + 4T \div D \quad (15)$$

Since dm/dx=constant=M

Equation (15) is simplified. The shear stress which appears in the last term of equation (15) is eliminated by introducing friction factor f via the definition $$4T = [\rho V^2 \div 2]f \quad (16)$$

or, by eliminating V by using equation (13).

$$4T = \{m^2 \div 2\rho[\pi D^2 \div 4]^2\}f \quad (17)$$

Friction factor f is a function of Reynolds number Re of the air flowing in the tube. There are many available algebraic relationships between the friction factor and the Reynolds number. The well established Blasius formula will be used here because it enables a closed form, analytical, algebraic solution to be obtained for p(x).

Reynolds Number Reference—The document relied on for the Reynolds Number and Equation(s) is the Fundamentals of Fluid Mechanics, B. R Munson, D. F. Young, and T. H. Okiiishi, Published by John Wiley & Sons, New York, 1990, Page 419.

The Blasius formula can be written as, $$f = 0.316 \div Re^{0.25} \quad (18)$$

and the Reynolds number is $$Re = 4m \div \mu \pi D \quad (19)$$

After substitution of equations (17), (18) and (19) and the introduction of dimensionless variables, the governing equation (15) for pressure distribution emerges in a simple form:

$$dP/dX = 4X + [L \div D][Re(L)]^{-0.25} X^{1.75} \quad (20)$$

where $$X = x/L, \quad Re(L) = 4m(L) \div \mu \pi D \quad (21)$$

and $$P(X) = [p(amb) - p(x)] + 0.5\rho[V(L)]^2 \quad (22)$$

$$V(L) = m(L) \div \rho[\pi D^2 \div 4] \quad (23)$$

Equation (20) is integrated to give P(x). Since it is a first-order differential equation, one boundary must be provided. For the contemplated design, the state of the air flowing into the proximal end would be specified. This includes the desired volumetric flow-rate in cubic feet per minute (which is equivalent to V(L) and the allowable pressure drop [p(amb)–p(L)]. With these, the value of P(1) can be specified, and this serves as the boundary condition for the differential equation (20).

The solution for the pressure distribution which incorporates the known boundary condition is $$P(X) - P(1) = 2[X^2 - 1] + 0.3636[L \div D][Re(L)]^{-0.25}[X^{2.75} - 1] \quad (24)$$

To extract a more physical form of equation (24), it can be identified as $$[p(x) - p(L)]/[p(amb) - p(L)] = [P(X) - P(1)]/P(1) \quad (25)$$

Equation (25) enables the pressure distribution along the tube to be presented in dimensionless form as a function of x/L.

To determine the Airflow Factor β(x), which is needed for the specification of the holes in the tube surface, the pressure difference quantity [p(amb)–p(x)] is required as input to equation (9). To extract this pressure difference from equation (24), it may be noted that, $$[p(amb) - p(x)] = [P(X)/P(1)][p(amb) - p(L)] \quad (26)$$

where pressure difference [p(amb)–p(L)] is a specified design parameter.

Once the flow area is calculated by using β(x) for each segment along the tube, it is a simple task to determine the size and quantity of the perforations. A computer program can be written to do the Fluid Flow Analysis in accordance with equation (26). A subsequent program can be used to determine the appropriate perforation pattern to suit the material and type of tube to be used in the application.

Figure 9:
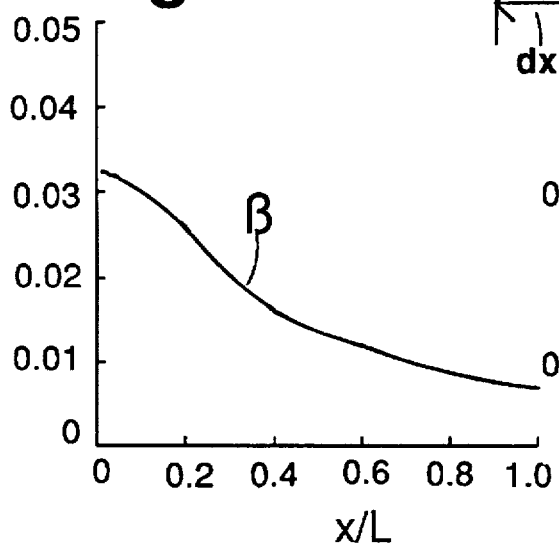
FIG. 9 A free-flow distribution chart.

FIG. 9 is a typical chart showing the area-fraction of tube wall allowing free-flow of air at a constant airflow rate through the wall at all points along the tube's length. This distribution chart refers to a circular cross-section duct as shown in FIG. 7. Where β is the fraction of wall area pervious to air and x/L is the proportional distance from the closed distal end. A chart of this type can be used to create a hole pattern for a perforated tube.

Figure 10:
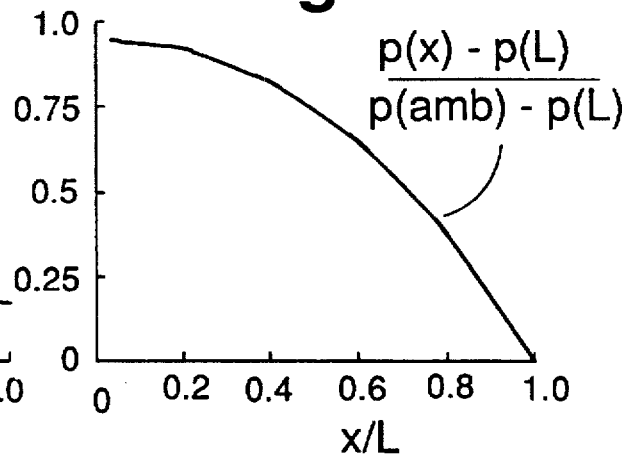
FIG. 10 An axial pressure distribution chart.

FIG. 10 is a typical predicted Axial Pressure Distribution Chart showing predicted air pressure at all points along the axis of the tube. The chart refers to a circular cross-section duct as shown in FIG. 7. Where: p(x) is the pressure in the tube at its axis at a point x, p(amb) is the ambient pressure in the air-environment surrounding the tube and p(L) is the pressure at the exit of the duct where x=L. The factor x/L is the proportional distance from the closed distal end. A chart of this type can be compared with actual pressures measured along the axis of a permeable tube to check that the permeability of the tube wall satisfies the "constant airflow" requirement.

Figure 11:
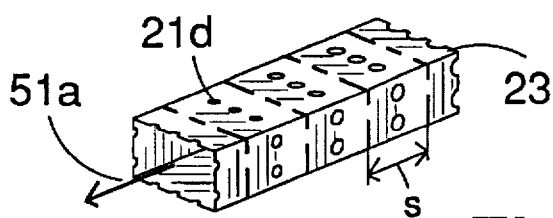
FIG. 11 Isometric view of a rectangular tube segment.

FIG. 11 is an isometric view of a short section of a rectangular permeable wall tube 23. The tube has a perforation pattern 21d which shows holes in the tube wall having increasingly larger diameter left to right along the tube.

Directional arrow 51a shows the air is moving right to left, the tube is therefore operating as an air collection tube. Each set of holes is in the middle of a portion of the length of the tube typically shown having a length s denoting a segment of the tube.

Figure 12:
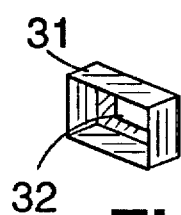
FIG. 12 A perforated end cap.

FIG. 12 shows a perforated rectangular cap 31 used for terminating a permeable walled tube of the type shown in FIG. 11. Rectangular perforation 32 is required to allow air to flow through the distal end of a shortened permeable walled tube.

The combination of a fan and a permeable wall tube having the type of permeability to air discussed in this disclosure has many other useful applications and is not limited to the few applications detailed in the text and the drawings.

What is claimed is:

1. An airflow apparatus comprising:
   a) an elongated tube having an axis, an axial length, a proximal end, a distal end, and a peripheral permeable wall around said axis, said wall having a surface area;
   b) said tube disposed in an air environment;
   c) said wall having a plurality of openings distributed along said axial length to allow said air to pass through said wall, said openings being arranged in size and quantity along said axial length to provide a progressively increasing wall air flow-through area per unit surface area of said wall along said axial length;
   d) said wall air flow-through area per unit surface area of said wall being at a minimum value proximate said proximal end and at a maximum value proximate said distal end;
   e) a fan connected to said tube by means of a duct, forcing said air to flow through said tube, said air flowing through said proximal end of said tube and at least a first portion of said air flowing through said wall of said tube;
   f) means for terminating said tube at said distal end, said terminating means defining a second portion of said air which flows through said distal end, said second portion of said air having a minimum magnitude of zero;
   g) said terminating means, said openings and said fan cooperating to define an airflow-rate through any portion of said wall along said axial length of said tube.

2. The apparatus of claim 1, wherein said fan causes said first portion of said air to flow through said proximal end and subsequently through said wall of said tube.

3. The apparatus of claim 1, wherein said fan causes said first portion of said air to flow through said wall and subsequently through said proximal end of said tube.

4. The apparatus of claim 1, wherein said terminating means is an air permeable cap.

5. The apparatus of claim 1, wherein said terminating means is an air impermeable cap.

6. The apparatus of claim 1, wherein said wall is formed from a woven material, said woven material being woven more tightly at said proximal end than at said distal end.

7. The apparatus of claim 1, wherein said flow-through area comprises a specific quantity of said openings increasing in size along said axial length.

8. The apparatus of claim 1, wherein said flow-through area comprises said openings being of uniform size, increasing in quantity along said axial length.

9. The apparatus of claim 1, wherein said airflow-rate through said wall is substantially equal at all portions of said wall.

* * * * *